United States Patent
Manghat et al.

(10) Patent No.: US 7,983,696 B1
(45) Date of Patent: Jul. 19, 2011

(54) DYNAMIC VARIATION OF PAGING POWER BASED ON PAGING SLOT FREQUENCY

(75) Inventors: Ajay Manghat, Overland Park, KS (US); Ashish Bhan, Shawnee, KS (US); Swaminathan Balakrishnan, Overland Park, KS (US); Jason P. Sigg, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 963 days.

(21) Appl. No.: 11/772,466

(22) Filed: Jul. 2, 2007

(51) Int. Cl.
*H04W 68/00* (2009.01)
(52) U.S. Cl. .................... 455/458; 455/522; 455/574
(58) Field of Classification Search .............. 455/458, 455/522, 550.1, 574, 41.2, 13.4, 114.2, 561; 370/318, 344; 340/7.35, 7.36, 7.37, 7.38
See application file for complete search history.

(56) References Cited

U.S. PATENT DOCUMENTS

| | | | | |
|---|---|---|---|---|
| 5,111,197 A * | 5/1992 | Ichikawa | .................... | 340/7.27 |
| 5,884,170 A | 3/1999 | Valentine et al. | | |
| 6,138,034 A * | 10/2000 | Willey | .......................... | 455/522 |
| 6,711,413 B1 * | 3/2004 | Heidari | ......................... | 455/515 |
| 6,856,789 B2 | 2/2005 | Pattabiraman et al. | | |
| 6,963,750 B1 * | 11/2005 | Cheng et al. | ................... | 455/458 |
| 7,583,984 B2 * | 9/2009 | Sun et al. | ...................... | 455/572 |
| 2005/0164741 A1 * | 7/2005 | Rajkotia et al. | ............... | 455/561 |
| 2007/0057767 A1 * | 3/2007 | Sun et al. | ...................... | 340/7.35 |
| 2007/0060175 A1 * | 3/2007 | Park et al. | ...................... | 455/458 |
| 2008/0317144 A1 * | 12/2008 | Huang et al. | ................... | 375/260 |

* cited by examiner

*Primary Examiner* — Jean A Gelin

(57) ABSTRACT

A mechanism for dynamically setting paging transmission power for a given mobile station based on the mobile station's paging slot frequency. For a mobile station that is set to operate at a higher paging slot frequency (e.g., lower slot cycle index), a wireless serving network transmits a page message to the mobile station at a higher power level, in order to increase the likelihood that the mobile station will successfully receive the page message. On the other hand, for a mobile station that is set to operate at a lower paging slot frequency (e.g., a higher slot cycle index), the network transmits a page message at a lower power level.

18 Claims, 2 Drawing Sheets

DYNAMIC VARIATION OF PAGING POWER BASED ON PAGING SLOT FREQUENCY

FIELD OF THE INVENTION

The present invention relates to wireless communications and, more particularly, to paging in of wireless devices such as cellular telephones for instance.

BACKGROUND

In a cellular communication system, the air interface used for communications from a base station to mobile stations (i.e., the forward link) is typically divided into a number of channels, including traffic channels used to carry bearer traffic (e.g., voice or other user data) and control channels used to carry overhead messages. Depending on the wireless technology used, the air interface can be divided into these channels through code division multiplexing (with each channel defined by modulation with a specific code), time division multiplexing (with each channel defined as a segment of time), frequency division multiplexing (with each channel defined by modulation with a specific frequency), and/or in some other manner.

In traditional systems operating according to the well known Code Division Multiple Access (CDMA) protocol such as CDMA2000, for instance, the forward link may define up to 64 channels, each distinguished by a unique "Walsh code." The control channels include a pilot channel defined by Walsh code 0, a synch channel defined by Walsh code 32, and a number of paging channels defined by Walsh codes 1 through 7, as necessary. The traffic channels, in turn, are defined by the remaining Walsh codes (up to 62 in total). Further, in a CDMA system, each sector of a base station cell is distinguished by a PN offset, which defines a sector-specific part of a pseudo-random number. Communications between a base station and a mobile station on a given channel, in a given sector, and on a given carrier frequency, are encoded using the Walsh code of the channel and the PN offset of the sector and are then carried on the carrier frequency. A mobile station receiving such a communication can then extract particular channels from the air interface by employing a "rake receiver" that scans through air interface signals in search of a signals that are encoded with particular combinations of PN offset and Walsh code.

Under CDMA2000, each paging channel is divided into a number of timeslots and is used to page a mobile station in order to determine whether the mobile station is available to receive a call or other communication (e.g., incoming packet data). Further the paging channel(s) may carry system information and call setup orders to facilitate establishment of calls or other communication sessions with the mobile station. For instance, the base station may transmit over a paging channel a general page message directed to a particular mobile station, the mobile station may respond to the page message, and the base station may then send to that mobile station over the paging channel a traffic channel assignment message directing the mobile station to tune to a particular traffic channel.

In more advanced systems operating according to the well known EV-DO protocol (as defined by industry standard IS-856 for instance), the forward link is divided into timeslots of 1.67 ms each, and each timeslot is further time division multiplexed to define various channels including a data channel and a control channel. The data channel is used to carry bearer data to a mobile station, and the control channel is used to carry control messages such as page messages for instance. In addition, as with legacy CDMA systems, each cell sector defined under IS-856 may have a respective PN offset and may operate on a particular carrier frequency, and so forward link communications may be encoded using the PN offset, modulated on the carrier frequency, and carried in a particular timeslot.

With EV-DO, the control channel can be used to page a mobile station and to assign traffic channel resources to the mobile station. For instance, the base station may transmit on the control channel a page message directed to a particular mobile station, the mobile station may respond to the page message, and the base station may then send to that mobile station on the control channel a traffic channel assignment message providing identifying information for a particular traffic channel. Still other paging mechanisms may be employed under other wireless communication protocols.

Many of today's mobile stations are highly portable devices running on battery power. If such a mobile station were to constantly monitor the air interface for page messages, the mobile station would quickly run out of battery power. To help avoid this, mobile stations are instead typically arranged to check for page messages only periodically. In particular, when a mobile station is not actively engaged in a communication, the mobile station may remain dormant or asleep but may wake up periodically to check the air interface for a relevant page message. Absent receipt of a relevant page message, the mobile station may then go back to sleep.

In practice, each mobile station may be arranged to operate at a given paging slot frequency that indicates how often the mobile station should wake up to check for page messages. Under CDMA2000 and EV-DO, for instance, each mobile station may have a given "slot cycle index" (SCI), which defines the frequency at which the mobile station will wake up to check the paging channel or control channel for a page. Under existing versions of these protocols, the slot cycle index defines the wakeup frequency by multiplying 1.28 seconds by 2 to the power of the slot cycle index. Thus, a mobile station operating at slot cycle index 0 (zero) would wake up and check for a page message every 1.28 seconds, whereas a mobile station operating at slot cycle index 2 would wake up and check for a page message every 5.12 seconds.

When a mobile station first registers with a cellular serving system, the mobile station and the serving system may negotiate for use of a given slot cycle index, or one may be preset for the mobile station. Thereafter, the serving system may then page the mobile station on a timeslot that the mobile station is set to check. For instance, if a mobile station is operating at slot cycle index 0, then the base station may page the mobile station in a timeslot that is some multiple of 1.28 seconds from time t=0, whereas if the mobile station is operating at slot cycle index 2, then the base station may page the mobile station in a timeslot that is some multiple of 5.12 seconds from time t=0.

Generally speaking, however, the more often a mobile station wakes up to check for a page message, the more quickly the mobile station's battery will drain. Therefore, it is generally desirable for a mobile station to operate at a relatively slow (or infrequent) slot cycle, such as at slot cycle index 2 for instance. Slot cycle index 2 is generally adequate to support paging for incoming telephone calls.

However, in some instances, it makes sense for a mobile station to operate at a faster slot cycle, such as slot cycle 0. By way of example, if a mobile station is operating in a push-to-talk (PTT) mode, in which another user might seek to establish "instant" communication with the mobile station, it would be best for the mobile station to operate at a faster slot cycle, so that the mobile station can more quickly detect a page message and thereby reduce latency in setting up the communication. Still other reasons may justify allowing a mobile station to operate at a higher paging slot cycle (lower slot cycle index). For instance, if the mobile station is actually a fixed position device connected to an AC power source, it might make sense to operate the mobile station at a higher paging slot cycle, since there is no concern that the mobile station's battery would drain from checking for page messages to often.

SUMMARY

Higher paging slot frequency serves to more quickly establish a connection with a mobile station. By the same token, however, higher paging power can also serve to more quickly establish a connection with a mobile station. In particular, if a base station uses a relatively low transmission power to transmit a page message to a mobile station, the mobile station might not properly receive the page message, and so the base station may need to retransmit the page message, thus increasing latency. On the other hand, if the base station uses a relatively high transmission power to transmit a page message to a mobile station, the mobile station may more readily receive the page message, thus reducing the likelihood of retransmission and decreasing latency.

Given that a wireless serving network typically knows the paging slot frequency at which each served mobile station is set to operate, the present invention involves dynamically setting paging transmission power for a given mobile station based on that mobile station's paging slot frequency. In particular, for a mobile station that is set to operate at a higher paging slot frequency (lower slot cycle index), the network would transmit a page message to the mobile station at a higher power level, in order to increase the likelihood that the mobile station will successfully receive the page message. On the other hand, for a mobile station that is set to operate at a lower paging slot frequency (higher slot cycle index), the network would transmit a page message at a lower power level.

In practice, for instance, the wireless serving network may have a normal power level at which it transmits page messages to mobile stations. In accordance with the present invention, the network could use that normal power level for transmitting page messages to mobile stations operating at a default paging slot frequency, such as slot cycle index 2 for instance. However, when the cellular network is going to page a mobile station that is set to operate at a higher paging slot frequency, such as slot cycle index 0 or 1 for instance, the cellular network may dynamically adjust the paging transmission power to a higher level, to help ensure prompt receipt of the page message by the mobile station. Conversely, when the cellular network is going to page the mobile station that is set to operate at a lower paging slot frequency, such as slot cycle index 3 or 4 for instance, the cellular network may dynamically adjust the paging transmission power to a lower level.

These as well as other aspects and advantages will become more apparent to those skilled in the art by reading the following detailed description, with reference where appropriate to the accompanying drawings.

DETAILED DESCRIPTION

Figure 1:
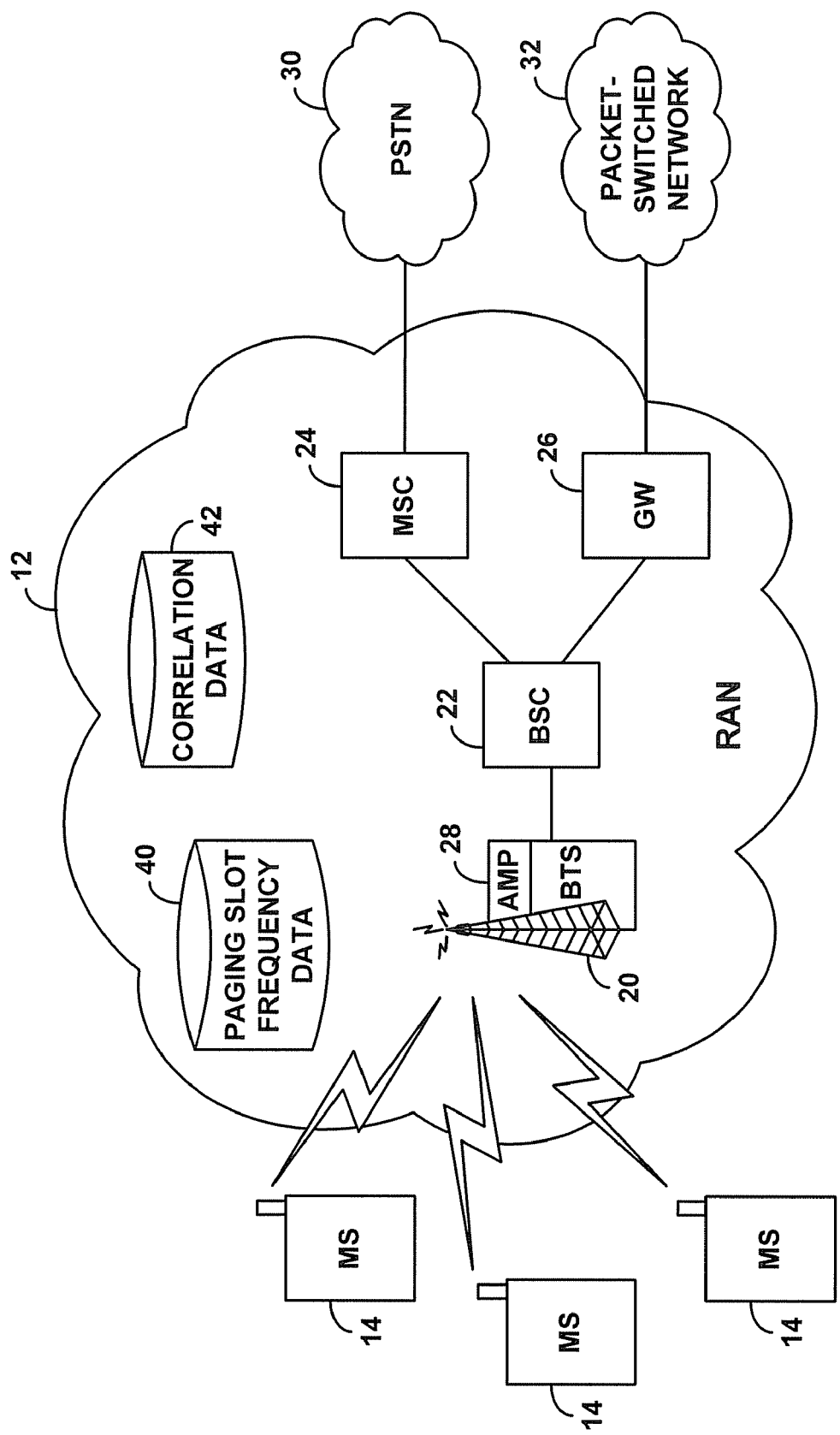
FIG. 1 is simplified block diagram of a communication system in which an exemplary embodiment of the invention can be implemented.

Referring to the drawings, as noted above, FIG. 1 is a simplified block diagram depicting a communication system in which an exemplary embodiment of the invention can be implemented. It should be understood, of course, that this and other arrangements and functions described herein (including in the summary section above) are provided by way of example only and that numerous variations may be possible. For instance, structural and functional elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions). Still further, the term "exemplary" as used herein should be understood to mean "serving as an example, instance, or illustration."

The system of FIG. 1 includes at its core a radio access network (RAN) 12 that is arranged to serve one or more mobile stations 14 via an air interface 16 (or multiple air interfaces 16). The system, including RAN 12, mobile stations 14, and air interface 16, may operate according to any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

Generally speaking, mobile stations 14 may be any wireless communication devices that are capable of wirelessly communicating with RAN 12 and, in particular, any wireless communication devices that are capable of being paged by RAN 12 and of operating at one or more paging slot frequencies. Examples of such mobile stations 14 include cellular telephones, wirelessly-equipped PDAs, wirelessly equipped personal computers, and wirelessly equipped appliances or devices of other sorts, now known or later developed.

As is well understood in the art, the term "mobile station" designates any such wireless communication device, regardless of whether the device is currently or permanently situated in a fixed position (e.g., attached to a wall or desk), and regardless of whether the device is easily movable (e.g., handheld or pocket-sized) or battery-operated. Wireless communication devices are considered to be "mobile stations" because they can usually be operated at various locations within the coverage of a serving RAN.

RAN 12, in turn, may be any wireless serving network that is capable of communicating over an air interface with one or more mobile stations, such as a mobile stations 14 for instance, and particularly such a network that is capable of paging mobile stations. As such, the RAN will include one or more antennas, one or more transceivers, and associated control logic for engaging in air interface communication with mobile stations according to any agreed air interface protocol. Further, the RAN will preferably include a variable power amplifier that facilitates transmitting of air interface communications at desired power levels.

The RAN 12 may provide connectivity with one or more transport networks and may include logic to set up and carry communications between served mobile stations and entities on the transport network(s). In particular, the RAN may include a network interface and may include program logic arranged to detect a communication (e.g., a signaling message or bearer traffic) arriving via the network interface that triggers paging of a particular mobile station, and to then page the mobile station via the air interface 16 and ultimately set up a communication path over the air to the mobile station.

Likewise, the RAN may enable the served mobile stations to communicate with each other. For instance, the RAN may include a switch, bridge, or router function and associated logic arranged to detect a communication arriving over the air from one served mobile station and destined to another mobile station, and to then page the target mobile station and ultimately set up a communication path via the RAN between the mobile stations.

Without limitation, FIG. 1 depicts an example configuration of RAN 12. As shown, the example RAN includes a base station 20, a base station controller (BSC) 22, a mobile switching center (MSC) 24, and a packet data gateway (GW) 26.

Base station 20 may include an antenna tower (or other antenna structure) and associated equipment, including a programmable processor for instance, arranged to communicate over air interface 16 with one or more served mobile stations 14. The base station 20 antenna and associated equipment may be arranged to define a cell and various cell sectors in which mobile stations can operate. Further, the base station 20 preferably includes, possibly for each sector, a power amplifier 28 such as a tower-top amplifier for instance, which is arranged to amplify RF signals for transmission over air interface 16 to mobile stations. Preferably, the power amplifier 28 has a variable gain that can be set by a control signal received from a controller such as BSC 22 or from other base station equipment for instance. Variable gain power amplifiers are well known in the art and are therefore not described in detail here.

BSC 22 is coupled with and functions to control one or more base stations such as base station 20, so as to manage aspects of base station and air interface operation. For instance, BSC 22 may manage handoff of mobile stations moving between base station coverage areas, and to schedule air interface transmissions of data or other bearer or control traffic via base stations to or from various mobile stations. Further, BSC 22 may programmatically control the power of transmissions over the air interface, such as by directing base station 20 to increase or decrease the gain of its power amplifier or to set the gain at a specific level for instance. Depending on the wireless protocol used, aspects of the base station 20 and BSC 22 may be combined together or distributed in other ways, generally defining a base station system.

MSC 24, in turn, is coupled with and functions to control one or more BSCs, such as BSC 22 for instance. For instance, MSC 24 may manage handoff of mobile stations moving between BSC coverage areas, and to direct BSC 22 to take various actions such as paging particular mobile stations. In a RAN where an MSC is provided, the MSC may generally control operation of the RAN. Alternatively, the BSC (sometimes referred to as a radio network controller (RNC)) may generally control operation of the RAN.

As shown, the MSC 24 is conventionally connected with the public switched telephone network (PSTN) 30, so as to enable suitably equipped mobile stations (e.g., cellular telephones) to engage in telephone calls or other PSTN communications with entities on the PSTN.

In typical operation, when a call is placed to a mobile station, the MSC 24 would receive a communication that triggers paging of the mobile station. For instance, the MSC 24 may receive an Integrated Services Digital Network User Part (ISUP) Initial Address Message (IAM) or other communication that signifies the call and identifies the mobile station. The MSC 24 would then send a paging request to the BSC 22. In turn, the BSC would direct the base station 20 to send a page message over the air interface 16 in an effort to locate the called mobile station. If the mobile station is located the coverage area of the RAN and receives the page message, the mobile station may then send a page response message over the air to the RAN. Thereafter, the BSC 22 may direct the base station to send an acknowledgement message to the mobile station, and the BSC may then direct the base station to send to the mobile station a channel assignment message that contains identifying information for a traffic channel, and the MSC 24 may connect the call through to the mobile station.

GW 26, in turn, is conventionally connected with a packet-switched network 34, such as the Internet or a wireless carrier's core transport network for instance. GW 26 may function as a network access server such as a packet data serving node (PDSN), to provide connectivity between circuit-switched communications with mobile stations and packet-switched communications on network 34. Further or alternatively, GW 26 may function as a media gateway (MGW) and may carry out functions that would otherwise be carried out by MSC 24. GW 26 may also function as a Mobile-IP (MIP) foreign agent and/or home agent for mobile stations arranged to engage in MIP communication via network 34, in a manner well known in the art.

BSC 22 and GW 26 may work together to enable suitably equipped mobile stations 14 to engage in packet-data communications on network 34. In practice, for instance, a mobile station may initially work with the RAN to establish packet-data connectivity in accordance with any agreed protocol. When a packet-data is transmitted to a mobile station, GW 26 and/or BSC 22 may receive the data as communication that triggers paging of the mobile station. GW 26 may, for instance, pass the data along to BSC 22 and instruct the BSC to page the mobile station, and BSC 22 may then direct the base station 20 to send a page message over the air interface 16 in an effort to locate the mobile station. If the mobile station is located the coverage area of the RAN and receives the page message, the mobile station may then send a page response message (e.g., a connection request message) over the air to the RAN. Thereafter, the BSC 22 may direct the base station to send to the mobile station a traffic channel assignment message that contains identifying information for a traffic channel, and the BSC may transmit the packet data via that traffic channel to the mobile station.

Each of the components of RAN 12, including base station 20, BSC 22, MSC 24 and GW 26, preferably includes a processor (one or more processors), data storage, and program instructions stored in the data storage and executable by the processor to carry out various functions described herein. Alternatively or additionally, these or other RAN components may include other forms of logic, such as firmware and/or hardware logic, to carry out various functions described.

To facilitate implementation of the invention, RAN 12 preferably includes or has access to paging slot frequency data 40 that indicates the paging slot frequency at which each served mobile station 14 is set to operate, so that RAN 12 can efficiently page the mobile station in accordance with that frequency (e.g., in paging channel slots the mobile station is set to check). The data 40 may be stored in one or more of the RAN elements discussed above or in a separate storage server or other entity accessible to one or more of those entities.

By way of example, the data 40 may comprise profile data stored in a visitor location register or the like, including a profile record respectively for each mobile station that is currently registered with the RAN. For a given mobile station, such a profile record may be established through an account provisioning system and normally stored in a home location register (not shown). The profile record may then be downloaded to the RAN using well known procedures when the mobile station powers on or otherwise enters into the coverage of the RAN. The profile record for each mobile station may indicate the mobile station's paging slot frequency, such as by indicating a slot cycle index of the mobile station. Alternatively, the profile record may indicate no paging slot frequency, in which case the RAN may programmatically assume that the mobile station is set to operate at a default paging slot frequency, such as at a slot cycle index of 2 for instance.

As another example, the RAN may generally broadcast in a system parameters message to all served mobile stations an indication of a default paging slot frequency (e.g., slot cycle index) that the mobile stations are to use. When a given mobile station seeks to establish communication with the RAN or to register with the RAN, the mobile station may send to the RAN a control signal that indicates a different paging slot frequency desired to be used, and the RAN may grant or deny the request to operate on that different paging slot frequency. In any event, given such control signaling or the like, the RAN may then update its data 40 to indicate the paging slot frequency at which the mobile station is currently set to operate.

In addition, also to facilitate implementation of the invention, RAN 12 preferably includes or has access to correlation data 42 that correlates paging slot frequencies (e.g., slot cycle indexes) with paging power levels or with paging power level adjustments. The correlation data 42 may take the form of a simple table that maps each possible paging slot frequency to a corresponding power amplifier gain setting or adjustment (or corresponding control signal to effect such a setting or adjustment), with the understanding that the power amplifier gain represents or constitutes the relevant transmission power level.

For instance, the correlation data 42 may correlate a slot cycle index of 2 with a certain power amplifier gain setting, a slot cycle index of 1 (higher paging slot frequency) with a higher power amplifier gain setting, and a slot cycle index of 3 (lower paging slot frequency) with a lower power amplifier gain setting. In practice, with knowledge of the slot cycle index for a mobile station to be paged, the RAN may then determine by reference to the correlation data what power amplifier gain setting to use and may accordingly set the power amplifier gain.

Alternatively, assuming the power amplifier has a normal or default gain (and thus a normal power), the correlation data 42 may correlate slot cycle index of 2 with "no change" to that normal gain, a slot cycle index of 1 with a designated upward adjustment (e.g., percentage increase) of the gain (to produce a higher gain), and a slot cycle index of 3 with a designated downward adjustment (e.g., percentage decrease) of the gain (to produce a lower gain). In practice, with knowledge of the slot cycle index for a mobile station to be paged, the RAN may then determine by reference to the correlation data what change if any to make to the normal gain and may dynamically make that change if any. After paging the mobile station, the RAN may then revert the amplifier to its normal gain.

Figure 2:
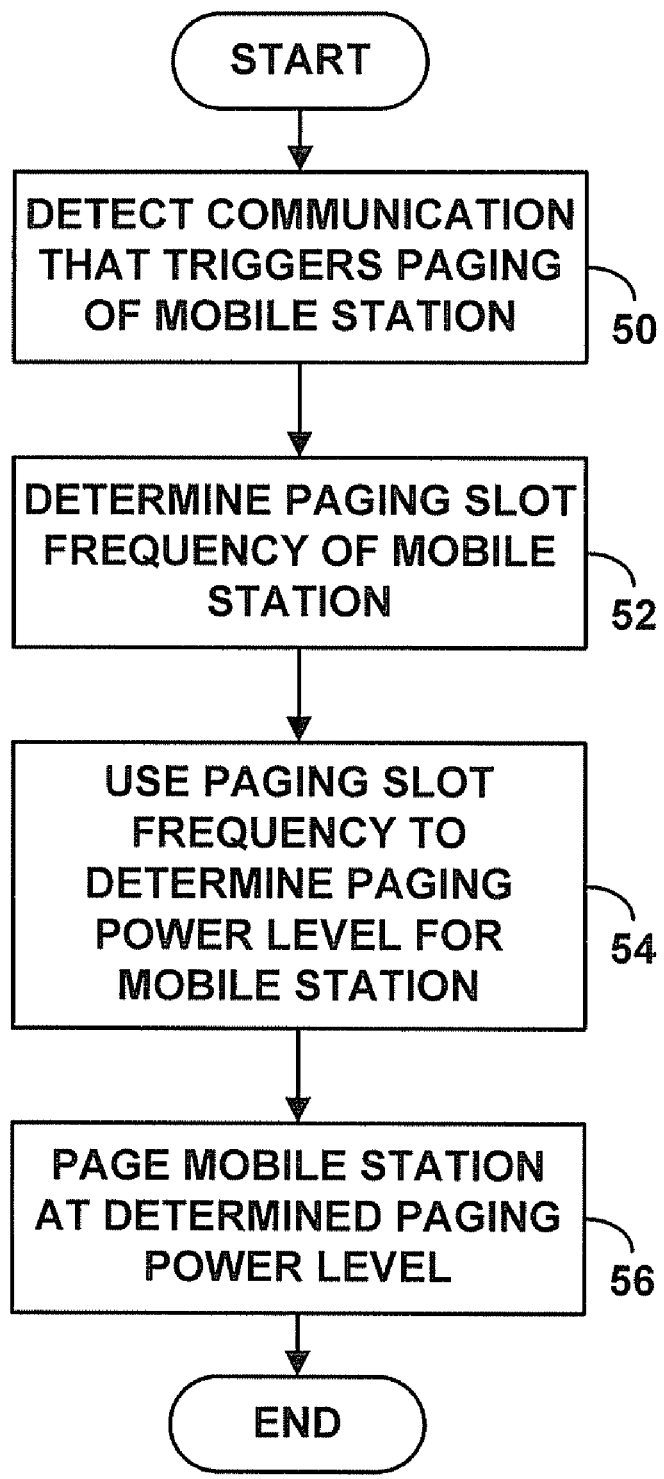
FIG. 2 is a flow chart depicting functions carried out in a radio access network in accordance with the exemplary embodiment.

FIG. 2 is next a flow chart depicting functions that can be carried out in accordance with the exemplary embodiment, to dynamically vary paging power based on mobile station paging slot frequency. As shown in FIG. 2, at step 50, the method involves detecting a communication that triggers paging of a mobile station. For instance, an MSC 24 or other RAN entity may receive a call setup message seeking to set up a call to the mobile station, or the GW 26 or BSC 22 may receive incoming packet-data to be delivered to the mobile station, in either case triggering the RAN to page the mobile station as described above.

In response to detecting the communication that triggers paging of the mobile station, at step 52, the RAN then determines a paging slot frequency of the mobile station. For instance, if the BSC 22, MSC 24, GW 26, or another RAN entity had received a call setup message, packet-data, or other communication that triggers paging the mobile station, that entity may reference the paging slot frequency data 40 to determine the paging slot frequency at which the mobile station is set to operate. Alternatively, the entity may signal to another entity to cause the other entity to reference data 40 to make that determination. Other methods of determining a mobile station's paging slot frequency could be used as well.

Furthermore, also in response to detecting the triggering communication, at step 54, the RAN uses the determined paging slot frequency to determine a paging power level for the mobile station. For instance, the RAN entity that received the triggering communication could reference the correlation data 42 to determine the paging power level or adjustment corresponding with the mobile station's paging slot frequency. Alternatively, the entity could signal to another entity to cause the other entity to make that determination. As a specific example, the MSC 24 could detect the triggering communication and could responsively determine the mobile station's paging slot frequency and could direct the BSC 22 to page the mobile station using that paging slot frequency. The BSC 22 could then reference the correlation data to determine a power level corresponding with the mobile station's paging slot frequency. Note that, in an alternative embodiment, the correlation data could be encoded as program logic of the RAN, so the referencing entity could simply execute that program logic to establish the power level based on the paging slot frequency.

Still further, also in response to detecting the triggering communication, at step 56, the RAN then uses the determined paging power to page the mobile station. For instance, the entity that referenced the correlation data and determined the applicable paging power level could send a control signal to the power amplifier 28 so as to set the power level of the amplifier, or the entity could signal to another entity to cause that setting to occur. As a specific example, if the correlation data specifies a particular gain setting, the entity could send a control signal to the power amplifier 28 to cause the amplifier gain to be set accordingly. Or if the correlation data specifies a particular gain adjustment, the entity could send a control signal to the power amplifier 28 to cause the amplifier gain to be adjusted accordingly. Other algorithmic functions could be applied to establish and set the paging power level based on the mobile station's paging slot frequency. In any event, once the transmission power level is dynamically set, the RAN then wirelessly outputs a page message at that paging power level (or amplified accordingly) for transmission over the air interface 16 and for receipt by the mobile station.

It should be understood that any or all of these functions can be carried out by any or all of the RAN entities described above (including, for instance, the base station 20, the BSC 22, the MSC 24, and/or the GW 26) and/or by any other RAN entity or entities. For instance, in another embodiment, the logical functions of FIG. 2 can all be carried out by the base station 20.

An exemplary embodiment of the invention has been described above. Those skilled in the art will appreciate that many modifications from the embodiment described are possible, while remaining within the spirit of the invention as claimed.

We claim:

1. A method in a cellular radio access network (RAN) comprising:
   receiving a communication that triggers paging of a mobile station; and
   responsively determining a paging slot frequency of the mobile station, using the determined paging slot frequency to determine a paging power for the mobile station, and using the determined paging power to page the mobile station,
   wherein using the determined paging slot frequency to determine a paging power for the mobile station comprises (i) using the determined paging slot frequency to determine an adjustment to make to a normal power at which the RAN wirelessly transmits page messages, and (ii) making the adjustment to the normal power so as to establish the paging power.

2. The method of claim 1,
   wherein determining the paging slot frequency of the mobile station comprises determining a paging slot cycle index of the mobile station, and
   wherein using the determined paging slot frequency to determine the paging power comprises using the determined paging slot cycle index to determine the paging power.

3. The method of claim 2, further comprising maintaining data that correlates paging slot cycle indexes with paging power adjustments, wherein using the determined paging slot cycle index to determine the adjustment comprises referring to the correlation data to determine the adjustment based on the determined paging slot cycle index.

4. The method of claim 2,
   wherein the RAN comprises a mobile switching center (MSC) and a base station controller (BSC),
   wherein receiving the communication that triggers paging of the mobile station comprises the MSC receiving the communication, and
   wherein using the determined slot cycle index to determine the paging power comprises the BSC using the determined slot cycle index to determine the paging power.

5. The method of claim 4, wherein determining the paging slot cycle index comprises the MSC determining the paging slot cycle index.

6. The method of claim 1, wherein the communication that triggers paging of the mobile station comprises a call setup request seeking setup of a call to the mobile station.

7. The method of claim 1, wherein the communication that triggers paging of the mobile station comprises packet-data destined to the mobile station.

8. The method of claim 1,
   wherein the paging power for the mobile station defines a power at which the RAN will wirelessly transmit a page message for receipt by the mobile station, and
   wherein using the determined paging power to page the mobile station comprises wirelessly transmitting the page message to the mobile station at the determined paging power.

9. The method of claim 1, wherein the adjustment comprises a percentage adjustment.

10. The method of claim 1, wherein determining a paging slot frequency of the mobile station comprises referring to a profile record for the mobile station to determine the paging slot frequency.

11. The method of claim 1, wherein the RAN includes a power amplifier and antenna arrangement, and wherein using the determined paging power to page the mobile station comprises using the power amplifier and antenna arrangement to transmit the page message at the determined paging power.

12. A cellular radio access network (RAN) comprising:
   a base station having an antenna arrangement for wirelessly communicating with mobile stations, wherein the base station transmits page messages to mobile stations at paging power levels; and
   program logic executable when paging a mobile station to dynamically set the paging power level for the mobile station based on a paging slot frequency of the mobile station, wherein the program logic is executable to set a higher paging power level powers for mobile stations having higher paging slot frequencies than other mobile stations,
   wherein the program logic is executable to establish the paging power level by determining, based on the paging slot frequency, an adjustment to make to a normal power amplifier gain used by the RAN to amplify page messages for wireless transmission, and by applying the adjustment so as to establish the paging power.

13. The RAN of claim 12, wherein the program logic resides at the base station.

14. The RAN of claim 12, further comprising a mobile switching center (MSC) and a base station controller (BSC), wherein the MSC determines the paging slot frequency of the mobile station and informs the BSC of the determined paging slot frequency, and wherein the BSC uses the determined paging slot frequency as a basis to set the paging power level at the base station for transmitting a page messages to the mobile station.

15. The RAN of claim 12, wherein the paging slot frequency is represented by a paging slot cycle index, and wherein the program logic is executable to dynamically set the paging power level for the mobile station based on the paging slot cycle index of the mobile station, at least in part by referencing correlation data that correlates paging slot cycle indexes with paging power adjustments.

16. The RAN of claim 12, wherein the program logic is further executable to determine the paging slot frequency of the mobile station by referring to a profile record for the mobile station.

17. The RAN of claim 12, wherein the base station includes a power amplifier, and wherein the program logic is executable to dynamically set the paging power level for the mobile station by dynamically setting a gain of the power amplifier.

18. The RAN of claim 12, wherein the program logic is executed to dynamically set the paging power level for the mobile station when the RAN detects a communication that triggers paging of the mobile station.

* * * * *